United States Patent

Komiya

(10) Patent No.: US 9,162,386 B2
(45) Date of Patent: Oct. 20, 2015

(54) CONTROLLER FOR AN INJECTION MOLDING MACHINE

(71) Applicant: FANUC Corporation, Yamanashi (JP)

(72) Inventor: Shingo Komiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/541,331

(22) Filed: Nov. 14, 2014

(65) Prior Publication Data

US 2015/0140148 A1    May 21, 2015

(30) Foreign Application Priority Data

Nov. 15, 2013 (JP) ................................. 2013-236489

(51) Int. Cl.
*B29C 45/77* (2006.01)
*B29C 45/76* (2006.01)
*B29C 45/50* (2006.01)

(52) U.S. Cl.
CPC ........... *B29C 45/762* (2013.01); *B29C 45/5008* (2013.01); *B29C 45/77* (2013.01)

(58) Field of Classification Search
CPC ............................ B29C 45/5008; B29C 45/77
USPC ................................................ 425/145, 149
See application file for complete search history.

(56) References Cited

U.S. PATENT DOCUMENTS

| | | | | | |
|---|---|---|---|---|---|
| 4,828,473 | A | * | 5/1989 | Otake et al. | 425/145 |
| 5,371,450 | A | * | 12/1994 | Hiraoka | 318/560 |
| 5,512,223 | A | * | 4/1996 | Morikita | 264/71 |
| 5,766,654 | A | * | 6/1998 | Groleau | 425/555 |
| 5,885,624 | A | * | 3/1999 | Katsuta et al. | 425/149 |
| 8,435,027 | B2 | * | 5/2013 | Nemoto et al. | 425/525 |
| 2005/0281905 | A1 | | 12/2005 | Uchiyama et al. | |
| 2009/0315205 | A1 | | 12/2009 | Koumaru | |

FOREIGN PATENT DOCUMENTS

| | | |
|---|---|---|
| JP | H02-178014 A | 7/1990 |
| JP | H02-274522 A | 11/1990 |
| JP | 4-339631 A | 11/1992 |
| JP | 2006-1134 A | 1/2006 |
| JP | 2010-721 A | 1/2010 |

OTHER PUBLICATIONS

Office Action mailed Mar. 3, 2015, corresponding to Japanese patent application No. 2013-236489.

* cited by examiner

*Primary Examiner* — Tim Heitbrink
(74) *Attorney, Agent, or Firm* — Hauptman Ham, LLP

(57) ABSTRACT

In a molding cycle, one process (intermediate process) is provided between an injection process and a packing process, and conditions for switching from the injection process to the intermediate process and switching from the intermediate process to the packing process are set individually. In the intermediate process, an injection pressure is detected and a target pressure is obtained based on the injection pressure. Pressure control in the intermediate process is performed based on the set target pressure.

8 Claims, 3 Drawing Sheets

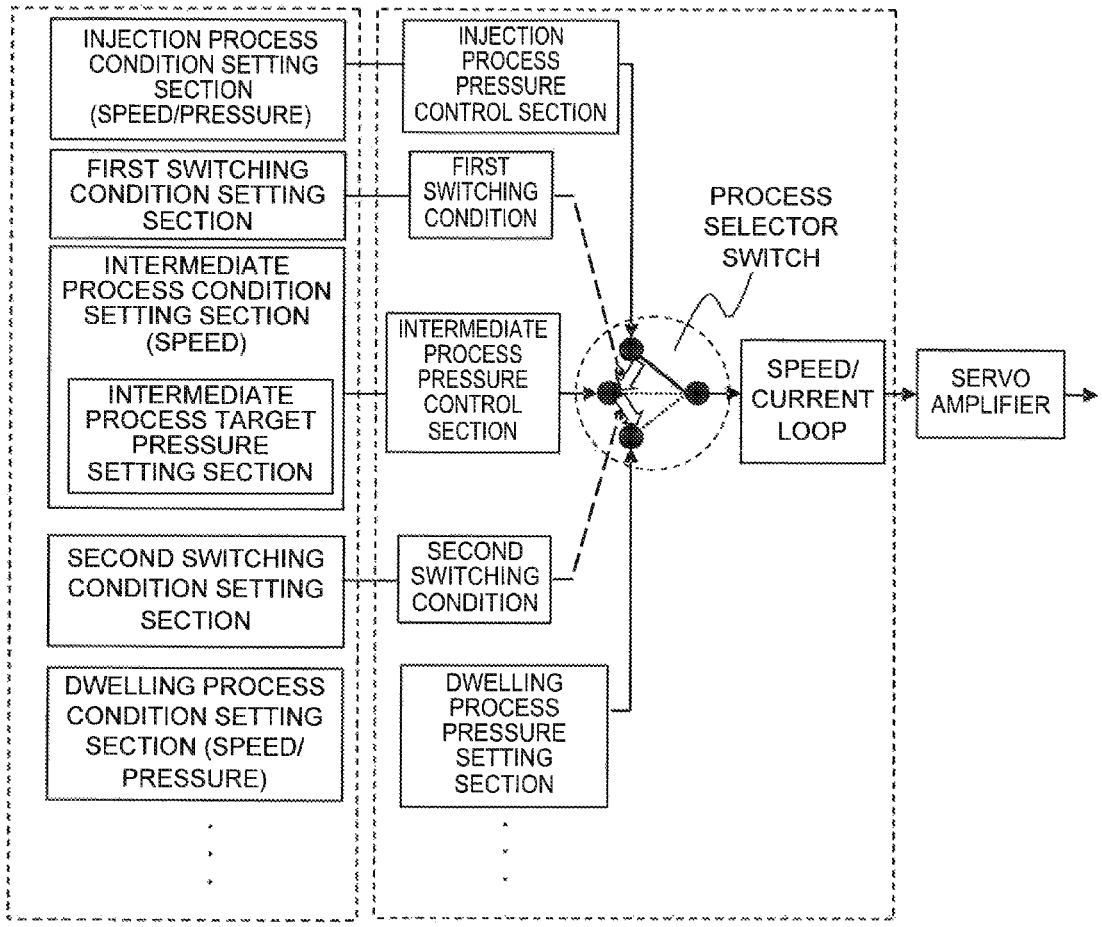
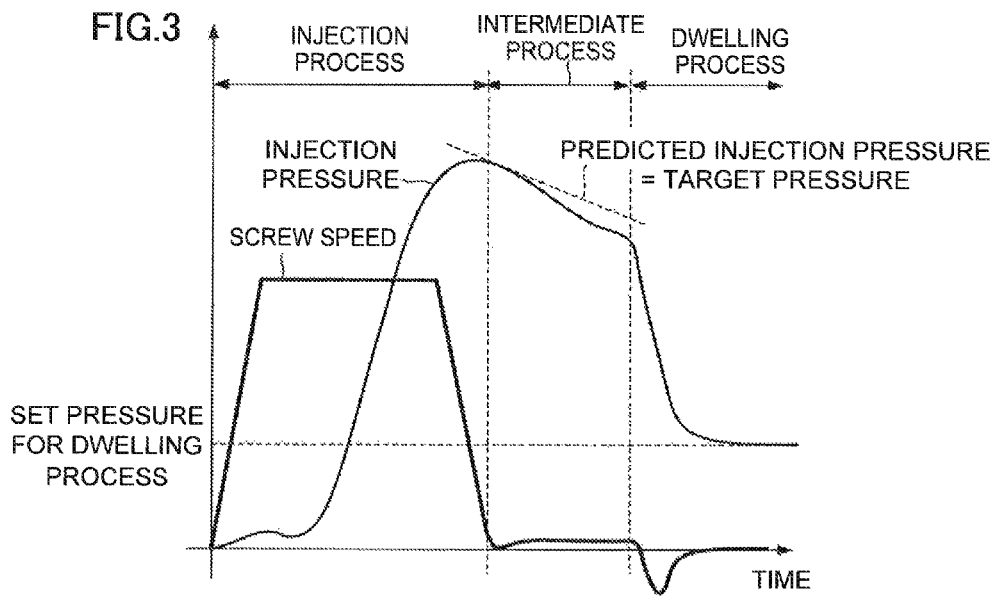

CONTROLLER FOR AN INJECTION MOLDING MACHINE

RELATED APPLICATIONS

The present application claims priority to Japanese Application Number 2013-236489, filed Nov. 15, 2013, the disclosure of which is hereby incorporated by reference herein in its entirety.

BACKGROUND OF THE INVENTION

1. Field of the Invention

The present invention relates to a controller for an injection molding machine.

2. Description of the Related Art

An in-line-screw injection molding machine is configured to perform a metering process, injection process, and packing process. In the metering process, a screw in a heating cylinder is rotated as it is retracted, whereby a molten resin is force-fed to the distal end portion of a heating cylinder. In the injection process, the screw is advanced thereafter to fill the molten resin into a mold.

In the injection process, the screw is advanced based on preset injection stroke and velocity to fill the molten resin in the heating cylinder into the mold. When the screw advances to an injection-packing switching position, the injection process is switched to the packing process.

In the packing process, pressure control is performed based on a preset packing pressure and a set time, whereby the molten resin is fully filled into the mold, and moreover, shrinkage cavity of molded products due to contraction of the resin is compensated. If resin flow passages in the mold are narrow or in order to fully fill the resin in thin-wall molding or the like, a high peak pressure sometimes may be needed in the injection and packing processes.

If the peak pressure is excessive, however, breakage of the heating cylinder and/or the mold, burrs on molded products, and other failures are caused. Therefore, a technique is needed to fully fill the resin into the mold without generating an excessive peak pressure.

Techniques to fully fill the resin with stability are disclosed in the following prior art documents.

Japanese Patent Application Laid-Open No. 2-178014 discloses a technique in which a filling process provided between a velocity process and a packing process is started when it is detected that the filling velocity is reduced to 50 to 60% of a set velocity in the velocity process and that the load pressure is increasing, as shown in FIG. 5. In this technique, the filling process is switched to the packing process when the screw velocity is reduced to a low level and the increased load pressure reaches a set filling pressure.

Japanese Patent Application Laid-Open No. 2-274522 discloses a technique in which pressure control is performed with a packing pressure (P2) higher than a switching pressure (P1) for a predetermined period of time after the passage of a preset position by an injected molten material extruding member and the attainment of a preset switching pressure by the injection pressure, as shown in FIG. 6.

In the prior art techniques described above, the necessary peak pressure for filling a resin into a cavity of a mold is reduced. The filling of the resin into the cavity of the mold is stabilized by generating an injection pressure higher than that for the injection process after the end of the injection process (velocity process). If an injection pressure higher than that for the injection process is generated, however, the possibility of breakage of a heating cylinder and/or the mold, burrs on molded products, and other failures increases.

SUMMARY OF THE INVENTION

Accordingly, the object of the present invention is to provide a controller for an injection molding machine, capable of reconciling suppression of the peak pressure with filling properties and achieving more stable molding quality.

A controller for an injection molding machine according to the present invention is configured so that an intermediate process is provided between an injection process and a packing process in one molding cycle, the injection process is switched to the intermediate process when a preset first switching condition is fulfilled, and the intermediate process is switched to the packing process when a preset second switching condition is fulfilled. The controller comprises a first switching condition setting section for setting the first switching condition, a second switching condition setting section for setting the second switching condition, an intermediate process target pressure setting section for setting an intermediate process target pressure based on the injection pressure detected in the intermediate process, and an intermediate process pressure control section configured to perform pressure control in the intermediate process based on the set intermediate process target pressure as a target pressure.

The intermediate process target pressure setting section can predict an injection pressure after a predetermined period of time, based on a temporal change in the detected injection pressure, and set, as the intermediate process target pressure, an injection pressure obtained by adding a predetermined value to, or subtracting a predetermined value from, the predicted injection pressure.

The intermediate process target pressure setting section can obtain the target pressure before the time of completion of the intermediate process when the injection process is switched to the intermediate process.

The intermediate process target pressure setting section can obtain the target pressure from moment to moment in the intermediate process.

The intermediate process target pressure setting section may comprise a pressure waveform storage section configured to store a pressure waveform in the intermediate process when a conforming product is molded, and the pressure waveform stored in the pressure waveform storage section may be used as the target pressure for the intermediate process.

The first switching condition setting section may be configured to set, as a condition for switching from the injection process to the intermediate process, at least one of conditions including an advance of the screw to a predetermined position, an increase of the injection pressure to a predetermined pressure, a reduction of a screw advanced velocity to a predetermined velocity, and a reduction of the increase of the detected injection pressure for each predetermined period below a predetermined value.

The second switching condition setting section may be configured to set, as a condition for switching from the intermediate process to the packing process, at least one of conditions including the passage of a predetermined period of time in the intermediate process, an advance of the screw by a predetermined distance by the intermediate process pressure control, an attainment of the intermediate process target pressure by the detected injection pressure, and a reduction of a screw advanced velocity to a predetermined velocity.

The intermediate process pressure control section may be configured to limit a screw advanced velocity to a preset velocity.

According to the present invention, there can be provided a controller for an injection molding machine, capable of reconciling suppression of the peak pressure with filling properties and achieving more stable molding quality.

BRIEF DESCRIPTION OF THE DRAWINGS

The above and other objects and features of the present invention will be obvious from the ensuing description of embodiments with reference to the accompanying drawings, in which:

FIG. 2 is a diagram illustrating control blocks of the controller for the injection molding machine according to the present invention;

FIG. 3 is a diagram illustrating a first embodiment of the controller for the injection molding machine according to the present invention;

DETAILED DESCRIPTION OF THE PREFERRED EMBODIMENTS

Figure 1:
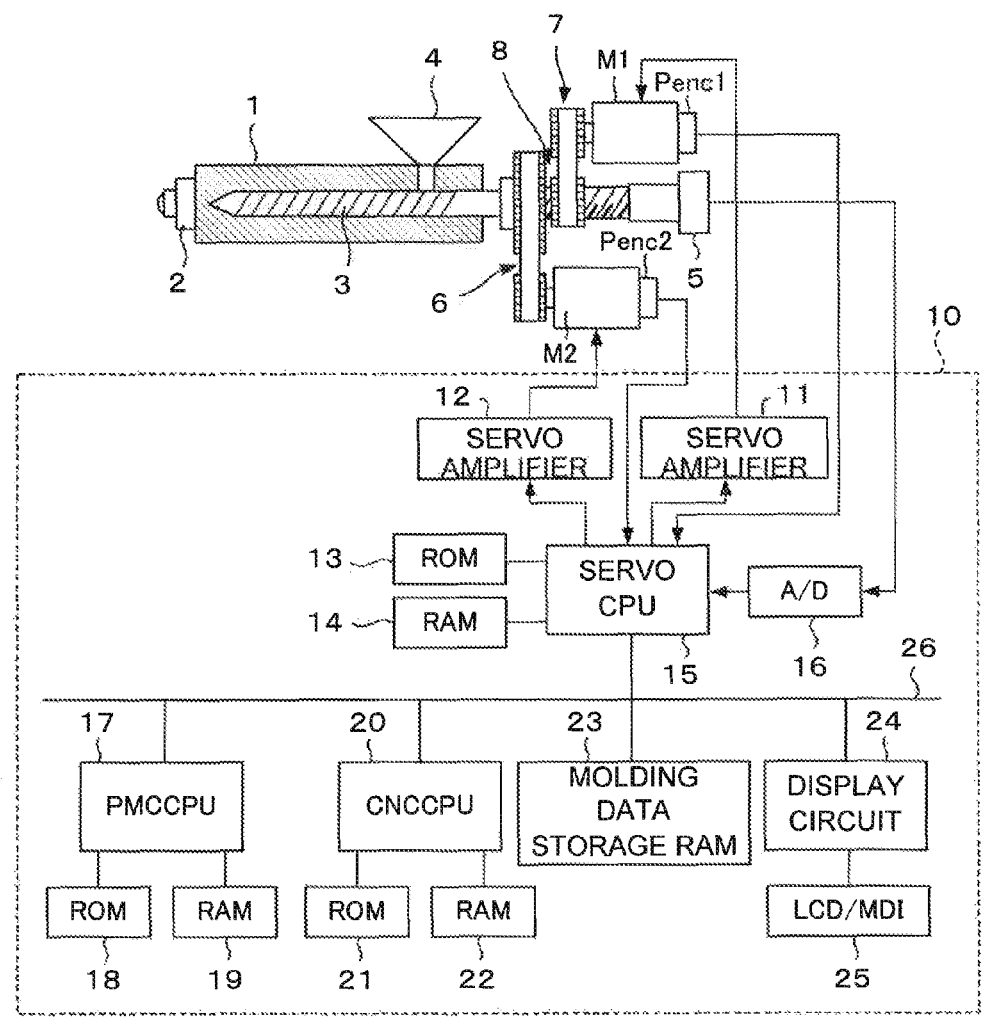
FIG. 1 is a schematic configuration diagram showing an injection molding machine and a controller for controlling the injection molding machine.

FIG. 1 shows a schematic configuration of an injection molding machine and a controller for controlling the injection molding machine.

A nozzle 2 is attached to the distal end of a cylinder 1 into which a screw 3 is inserted, and a hopper 4 for supplying resin pellets to the cylinder 1 is mounted on the rear end portion of the cylinder. The screw 3 is axially driven by drive means, including an injection servomotor M1, transmission mechanism 7, and conversion mechanism 8 configured to convert a rotary motion of a ball screw-nut assembly or the like to a linear motion, to perform injection and back-pressure control. Further, the screw 3 is rotationally controlled by rotation drive means, including a servomotor M2 and a transmission mechanism 6 composed of a belt, pulleys, etc.

The injection servomotor M1 and the servomotor M2 for screw rotation are fitted, respectively, with position/velocity sensors Penc1 and Penc2 for detecting their rotational positions and velocitys. These position/velocity sensors Penc1 and Penc2 can detect the position (screw-axial position), moving velocity (injection velocity), and rotational velocity of the screw 3. Further, a pressure sensor 5, such as a load cell, is provided for detecting a screw-axial pressure (injection pressure) from a molten resin that acts on the screw 3.

A PMC-CPU 17 is connected with a ROM 18, which is stored with a sequential program for controlling the sequential operation of the injection molding machine, and a RAM 19 used for temporary storage of arithmetic data and the like. A CNC-CPU 20 is connected with a ROM 21, which is stored with automatic operation programs for generally controlling the injection molding machine, and a RAM 22 used for temporary storage of arithmetic data and the like.

A servo CPU 15 is connected with a ROM 13, which is loaded with a dedicated control program for servo control for position, velocity, and current loop processing, and a RAM 14 used for temporary storage of data. Further, the servo CPU 15 is connected with a servo amplifier 11, which drives the injection servomotor M1 based on a command from the servo CPU 15, and a servo amplifier 12 configured to drive the servomotor M2 for screw rotation.

The position/velocity sensors Penc1 and Penc2 are mounted on the injection servomotor M1 and the servomotor M2 for screw rotation, respectively. Outputs from these position/velocity sensors Penc1 and Penc2 are fed back to the servo CPU 15. The servo CPU 15 performs position and velocity feedback control, based on a move command for each axis (injection servomotor M1 or servomotor M2 for screw rotation) issued from the CNC-CPU 20 and detected positions and velocitys fed back from the position/velocity sensors Penc1 and Penc2. Also, the servo CPU 15 performs current feedback control, thereby drivingly controlling the servo amplifiers 11 and 12.

Further, a current position register is provided for obtaining an advanced position (axial position) of the screw 3 based on a position feedback signal from the position/velocity sensor Penc1. This current position register can detects the screw position. Furthermore, a resin pressure (on the screw) obtained by converting a detection signal from the pressure sensor 5 to a digital signal is input to the servo CPU 15.

An LCD/MDI 25 with a display unit, such as a liquid crystal display, is connected to a bus 26 through a display circuit 24. A RAM 23 for molding data storage, which is formed of a nonvolatile memory, is also connected to the bus 26. The RAM 23 is stored with molding conditions, various set values, parameters, macro variables, etc., related to injection molding operation. The molding data storage RAM 23 is also used for the storage of a target pressure waveform in an intermediate process, which will be described later.

With this construction, the PMC-CPU 17 controls the sequential operation of the entire injection molding machine. Based on operation programs of the ROM 21, the molding conditions stored in the molding data storage RAM 23, etc., the CNC-CPU 20 distributes move commands to the servomotor M1 and M2 for the individual axes. Based on the move commands distributed for the individual axes (or the servomotor M1 and M2), position and velocity feedback signals detected by the position/velocity sensors Penc1 and Penc2, etc., moreover, the servo CPU 15 performs position, velocity, and current loop servo-controls or the so-called digital servo processing, in the same manner as in the conventional case.

Molding operation processes of the injection molding machine roughly include a mold closing process, injection process, packing process, cooling process, metering process, mold opening process, and ejection process. A mold is closed and clamped in the mold closing process. In the injection process, the screw is advanced and the molten resin is injected and filled into the mold. In the packing process, the pressure of the resin in the mold is controlled after the molten resin is filled into the mold. The resin in the mold is cooled in the cooling process. In the metering process, the screw is rotated against back-pressure to melt the resin, and the resulting molten resin is metered. The mold is opened in the mold opening process. A molded product is ejected and removed from the mold in the ejection process.

The techniques described above are generally known in the related field. The object of the present invention is to enable the controller for the injection molding machine to reconcile suppression of the peak pressure with filling properties and achieve more stable molding quality. Specifically, the present invention is characterized in that the intermediate process is provided between the injection and packing processes, a target pressure is obtained from the temporal change in an injection pressure detected in the intermediate process, and pressure control is performed based on the obtained target pressure. In this way, the resin can be stably filled into a cavity while eliminating the possibility of the failures anticipated in the prior art described above. The following is a description of embodiments of the present invention.

A first embodiment of the controller for the injection molding machine according to the present invention will now be described with reference to FIGS. 2 and 3.

The following is a description of a molding cycle performed by the controller for the injection molding machine.

When the metering process is started after completion of the injection and packing processes, the servomotor M2 for screw rotation is driven to rotate the screw 3, whereupon a raw material resin (not shown) is fed from the hopper 4 into the cylinder 1. As the screw 3 rotates, the fed raw material resin is delivered to the distal end portion of the cylinder 1 while being heated and kneaded. As the raw material resin is kneaded and delivered to the distal end portion of the cylinder 1, the screw 3 is gradually retracted and finally reaches a retraction stop position. The molten raw material resin (not shown) is filled into the distal end portion of the cylinder 1, and the servo CPU 15 confirms the arrival of the screw 3 at the retraction stop position by a signal from the position/velocity sensor Penc2. Thereupon, the servomotor M2 for screw rotation and the screw 3 are stopped from rotating.

(Injection Process)

When the injection process of the molding cycle is then started, the injection servomotor M1 is driven to push out the screw 3 forward into the cylinder 1, thereby injecting the molten resin into a cavity of the mold (not shown). As this is done, a drive command is issued to the servo amplifier 11 for driving the injection servomotor M1, accompanied by acceleration or deceleration based on a set injection velocity. On the other hand, the injection pressure detected by the pressure sensor 5 increases as the screw 3 advances. If the advance of the screw 3 is decelerated or stopped during the injection process, the molten resin flows from the cylinder 1 into the mold cavity, so that the amount of increase of the injection pressure for each predetermined period of time and the injection pressure itself are reduced.

(Intermediate Process)

The injection process is switched to the intermediate process when at least one of the following conditions is fulfilled. These conditions include an advance of the screw 3 to a predetermined position, increase of the injection pressure to a predetermined pressure, reduction of the screw advanced velocity to a predetermined velocity, and reduction of the increase of the injection pressure for each predetermined period below a predetermined value. The conditions for switching from the injection process to the intermediate process are set by a "first switching condition setting section" of the controller.

For a target pressure for the intermediate process, an injection pressure at a time point when a predetermined time elapses from the present time is predicted, as a target pressure, at an arbitrary timing in the intermediate process, based on an injection pressure detected during a time interval between a time point preceding the present time by a predetermined time and the present time point. In obtaining the target pressure by periodically sampling the injection pressure, for example, it may be calculated by linear approximation based on a first injection pressure which is detected at a sampling time point preceding the arbitrary time point during the intermediate process by one to several sampling periods and second injection pressure which is detected at the present sampling time point. Alternatively, the target pressure may be calculated at an arbitrary timing in the intermediate process by polynomial approximation, based on a plurality of injection pressures detected during a time interval between a time point preceding the present sampling time by a predetermined sampling periods and the present sampling time point. The target pressure may be calculated from predicted pressures before the point in time the intermediate process is completed, at the time when the injection is switched to the intermediate process.

At the point in time when the injection process is switched to the intermediate process, the injection pressure after a predetermined period since the time of switching is predicted. Thereafter, injection pressures for the subsequent sampling time points may be sequentially repeatedly predicted, that is, the injection pressures in the intermediate process may be predicted and obtained from moment to moment. The target pressure for the intermediate process is set by an "intermediate process target pressure setting section" of the controller.

The target pressure during the intermediate process is predicted in the pressure control in the intermediate process described above. Instead of predicting the target pressure, however, a pressure waveform obtained when a conforming product is molded may be previously stored as a target pressure waveform in the RAM 23 so that the pressure control in the intermediate process can be performed based on the target pressure waveform stored in the RAM 23 in the subsequent molding cycles.

In order to obtain the target pressure waveform described above, the velocity is controlled to be a set velocity in the intermediate process of an initial molding operation, and an operator checks a molded product obtained in the molding operation to see if it is a conforming product. If the product is determined to be conforming, the pressure waveform measured during the intermediate process of the molding operation in which the conforming product is obtained is stored as the target pressure waveform in the RAM 23.

(Packing Process)

The intermediate process may be switched to the packing process on condition that an elapsed time in the intermediate process reaches a predetermined time or the screw advances a predetermined distance by the pressure control. If the cavity is not fully filled by the time the injection process is switched to the intermediate process, the resin flows into the cavity in the intermediate process.

Immediately after the injection process is switched to the intermediate process, an injection pressure does not reach the target pressure yet, and the screw advanced velocity is increased by the pressure control. As completion of the filling is approached, the inflow of the resin into the cavity is reduced, so that the screw advanced velocity is reduced. If the pressure control is continued as it is, the injection pressure reaches the target pressure. Thus, the intermediate process may alternatively be switched to the packing process on condition that the detected injection pressure reaches the target pressure or the screw advanced velocity be reduced to the predetermined velocity. The condition for switching from the intermediate process to the packing process is set by a "second switching condition setting section" of the controller.

Pressure control in the intermediate process is performed based on the set intermediate process target pressure as the target pressure. This pressure control is performed by an "intermediate process pressure control section" of the controller. During the pressure control in the intermediate process by the intermediate process pressure control section, the screw advanced velocity may be limited lest the resin be excessively compressed by the screw advance.

Figure 4:
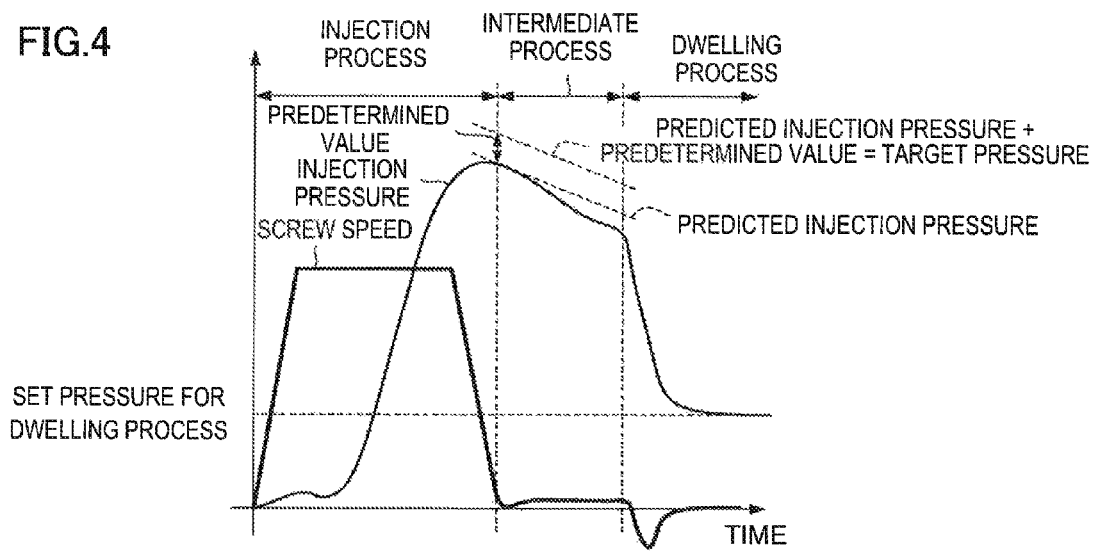
FIG. 4 is a diagram illustrating a second embodiment of the controller for the injection molding machine according to the present invention.
Figure 5:
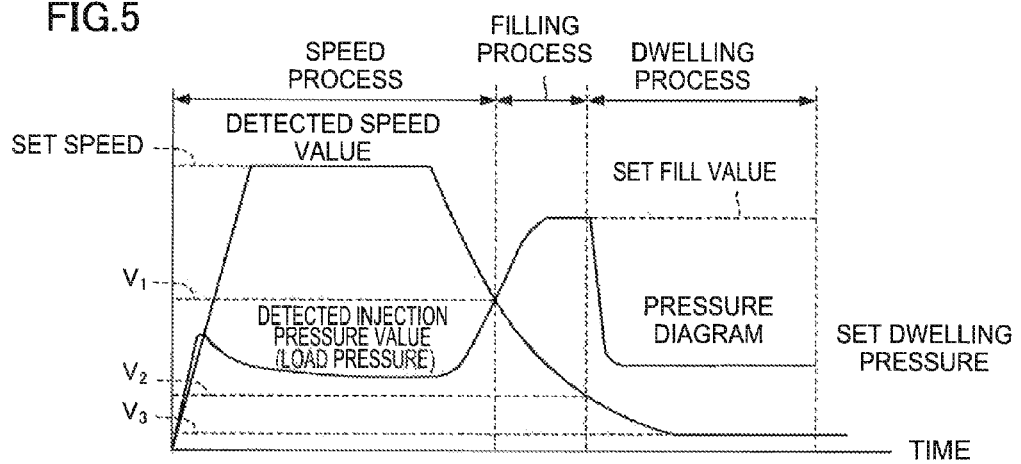
FIG. 5 is a diagram illustrating a first mode of control (with a filling process between a velocity process and a packing process) performed by a conventional controller for controlling an injection molding machine.
Figure 6:
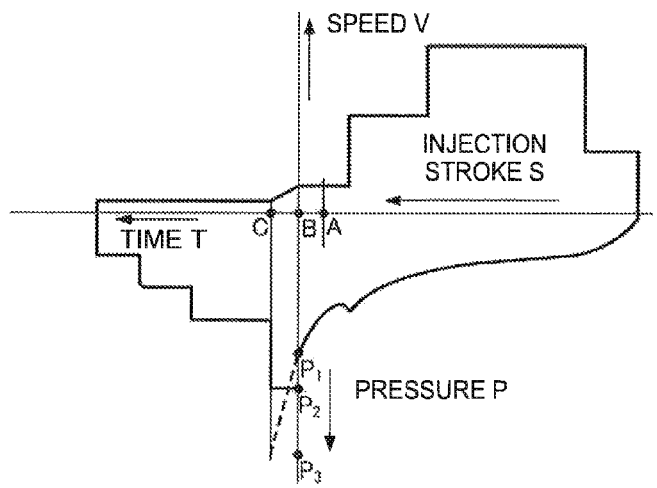
FIG. 6 is a diagram illustrating a second mode of control (pressure control with a packing pressure higher than a switching pressure for a predetermined period of time after switching) performed by a conventional controller for controlling an injection molding machine.

A second embodiment of the controller for the injection molding machine according to the present invention will now be described with reference to FIG. 4.

The following is a description of only a difference between the first and second embodiments. In the second embodiment, a predicted injection pressure may be used directly as the target pressure for the intermediate process or the sum of or difference between the predicted injection pressure and a predetermined value may be used for the purpose so that the filling amount can be adjusted.

The invention claimed is:

1. A controller for an injection molding machine, configured so that an intermediate process is provided between an injection process and a packing process in one molding cycle, the injection process is switched to the intermediate process when a preset first switching condition is fulfilled, and the intermediate process is switched to the packing process when a preset second switching condition is fulfilled, the controller comprising:
   a first switching condition setting section for setting the first switching condition;
   a second switching condition setting section for setting the second switching condition;
   a pressure sensor for detecting an injection pressure;
   an intermediate process target pressure setting section for setting an intermediate process target pressure based on the injection pressure detected by the pressure sensor in the intermediate process; and
   an intermediate process pressure control section configured to perform pressure control in the intermediate process based on the set intermediate process target pressure as a target pressure.

2. The controller for an injection molding machine according to claim 1, wherein the intermediate process target pressure setting section predicts an injection pressure after a predetermined period of time, based on a temporal change in the detected injection pressure, and sets, as the intermediate process target pressure, an injection pressure obtained by adding a predetermined value to, or subtracting a predetermined value from, the predicted injection pressure.

3. The controller for an injection molding machine according to claim 1, wherein the intermediate process target pressure setting section obtains the target pressure before the time of completion of the intermediate process when the injection process is switched to the intermediate process.

4. The controller for an injection molding machine according to claim 1, wherein the intermediate process target pressure setting section obtains the target pressure from moment to moment in the intermediate process.

5. The controller for an injection molding machine according to claim 1, wherein the intermediate process target pressure setting section comprises a pressure waveform storage section configured to store a pressure waveform in the intermediate process when a conforming product is molded, and the pressure waveform stored in the pressure waveform storage section is used as the target pressure for the intermediate process.

6. The controller for an injection molding machine according to claim 1, wherein the first switching condition setting section sets, as a condition for switching from the injection process to the intermediate process, at least one of conditions including an advance of the screw to a predetermined position, an increase of the injection pressure to a predetermined pressure, a reduction of a screw advanced velocity to a predetermined velocity, and a reduction of the increase of the detected injection pressure for each predetermined period below a predetermined value.

7. The controller for an injection molding machine according to claim 1, wherein the second switching condition setting section sets, as a condition for switching from the intermediate process to the packing process, at least one of conditions including the passage of a predetermined period of time in the intermediate process, an advance of the screw by a predetermined distance by the intermediate process pressure control, an attainment of the intermediate process target pressure by the detected injection pressure, and a reduction of a screw advanced velocity to a predetermined velocity.

8. The controller for an injection molding machine according to claim 1, wherein the intermediate process pressure control section is configured to limit a screw advanced velocity to a preset velocity.

\* \* \* \* \*